Patented Dec. 23, 1952

2,623,051

UNITED STATES PATENT OFFICE 2,623,051

21-BROMO STEROIDS

Edward C. Kendall, Rochester, Minn., assignor to Research Corporation, New York, N. Y., a corporation of New York No Drawing. Application January 3, 1950, Serial No. 136,659

4 Claims. (Cl. 260—397.4)

In my application Serial No. 128,687, filed November 21, 1947, entitled "Intermediate Compounds in the Synthesis of Dehydrocorticosterone," I have described a process which includes the synthesis of $3(a)$-acyloxy-11-keto-12-bromo-24,24-diphenyl-$\Delta^{20:22,23:24}$-choladienes.

The present invention relates particularly to the production of derivatives of said choladienes having a substituent such as an oxymethyl group in the 21-position thereof and more generally to the introduction of bromine and substituents therefor into the 21-position of compounds related to the bile acids, that is, having a steroid structure, and having at the 17-position a five carbon chain with a double bond at position 20, 22 and a methyl group at position 20, e. g., bile acids, cholic acid, desoxycholic acid, lithocholic acid and the 3,9-epoxy derivatives as disclosed in my application Serial No. 653,176, filed March 8, 1946, now Patent No. 2,541,074.

The essential conditions of the process for the introduction of bromine at the 21-position are the use of an anhydrous organic solvent such as carbon tetrachloride, the presence of bromosuccinimide in the reaction mixture and boiling the mixture while it is subjected to illumination.

As is disclosed in said application the $3(a)$-3(a) - acetoxy-11-keto-12-bromo-24,24-diphenyl-$\Delta^{20:22,23:24}$-choladiene (31) is prepared from $3(a)$-acetoxy-11-keto-12-bromo-24,24-diphenyl-$\Delta^{23:24}$-cholene (29) by treatment with one molar equivalent of bromosuccinimide in the presence of light. This treatment results in the introduction of bromine in position 22 giving a compound represented by Formula 30 in said application, i. e., $3(a)$-acetoxy-11-keto-12,22-dibromo-24,24-diphenyl-$\Delta^{23:24}$-cholene and when this bromo derivative is heated in carbon tetrachloride, hydrogen bromide is eliminated with formation of a double bond 20:22 (Compound 31).

It has now been found that the resulting diene (31) will react with a second mole of bromosuccinimide in the presence of light with the formation of the 21-bromo derivative thereof (Compound I) which can be separated in pure form by crystallization from ligroin.

The bromo group at $C_{21}$ in the diene I is readily replaced by the acetoxyl group by treatment with sodium acetate in acetic acid to give $3(a),21$-diacetoxy-11-keto- 12 -bromo - 24,24 - diphenyl-$\Delta^{20:22,23:24}$-choladiene (Compound II). In methanol, Compound I is converted into the corresponding 21-methoxy compound and the acetyl group is removed from $C_3$ at the same time to give $3(a)$-hydroxy- 11 -keto-12-bromo-21-methoxy - 24,24-diphenyl-$\Delta^{20:22,23:24}$-choladiene, Compound III. Reacetylation at $C_3$ yields $3(a)$-acetoxy-11-keto - 12 - bromo-21-methoxy-24,24 - diphenyl - $\Delta^{20:22,23:24}$ - choladiene, Compound IV. When Compound III is oxidized by the Oppenauer method the 3-acetoxy group is changed to a ketone to give 3,11-diketo-12-bromo-21-methoxy-24,24-diphenyl-$\Delta^{20:22,23:24}$-choladiene, Compound V.

While it is desirable that the 3-OH group be protected by acylation during the treatment with bromosuccinimide, the nature of the acyl radical is not important and other acids than acetic acid may be utilized to acylate the 3-OH, for example, propionic, benzoic or p-nitrobenzoic acids, the corresponding 3-acyl-21-bromo compound (I) being formed.

The 3-OH group may also be protected during the reaction by forming the 3,9-epoxy derivative of the compound to be treated.

Compounds I to V are illustrated in the following flow sheet:

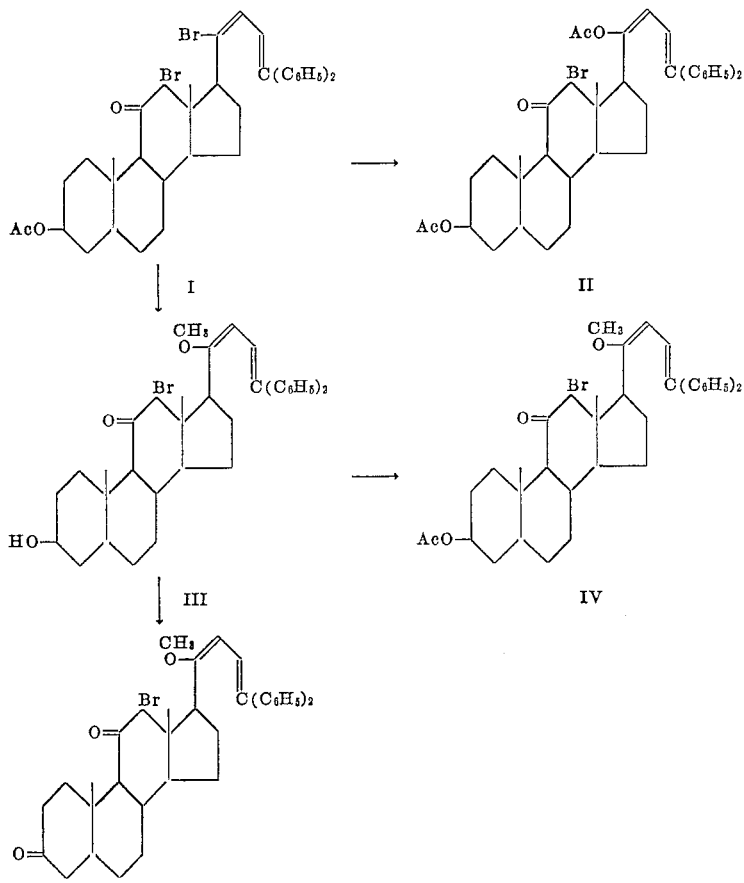

The following is a typical example of the process:

*Preparation of 3(a) acetoxy-11-keto-12,21-dibromo-24,24-diphenyl-$\Delta^{20:22,23:24}$-choladiene (I)*

3(a) acetoxy-11-keto-12-bromo-24,24-diphenyl-$\Delta^{23:24}$-cholene (29) was treated with bromosuccinimide as described in my application Serial No. 733,188 and the reaction product (30) was dehydrobrominated by refluxing for 6 hours. The absorption spectrum of this solution showed the following maximum: in CCl₄ at 310 mu, $\epsilon=20,800$ ($E=330$); in MeOH (+1% CCl₄) at 304 mu, $\epsilon=20,600$ ($E=328$). Since for 3,9-epoxy-11-keto-24,24-diphenyl-$\Delta^{20:22,23:24}$-choladiene $\epsilon$ is 28,800 ($E=518$) at 304 mu in MeOH and since for the 21-acetoxy and 21-methoxy derivatives of 3(a)-acetoxy - 11 - keto - 12 - bromo - 24,24 - diphenyl-$\Delta^{20:22,23:24}$-choladiene $\epsilon$ is 27,000 at 305 mu, it must be assumed that the above material contains only approximately 75 per cent diene (31).

The crude "diene" (31) obtained from 80 g. of the "ethylene" (29) was dissolved in 960 ml. carbon tetrachloride, mixed with 23.52 g. of 96 per cent bromosuccinimide and boiled for 20 minutes over a light bulb, cooled and filtered. The filtrate was brought to almost complete dryness and petroleum ether added. 63.0 g. (70.2 per cent) of crystalline material separated. Recrystallization from about 200 ml. hot benzene and 200 ml. hot petroleum ether yielded a first crop of 49.0 g. (54.7 per cent) with $E=377$ at 325 mu in chloroform and a second crop of 6.6 g. (6.9 per cent) with $E=364$.

*Preparation of 3(a),21-diacetoxy-11-keto - 12 - bromo - 24,24 - diphenyl -$\Delta^{20:22,23:24}$ - choladiene (II) from the corresponding 21-bromo compound (I)*

1.42 g. of the bromo compound and 12 ml. of N/3 sodium acetate in glacial acetic acid was kept on the steam bath with intermittent shaking for 1½ hours. After cooling the reaction product was taken up in chloroform, washed with water, then sodium bicarbonate and again water, dried and evaporated. When methanol was added to the residue it crystallized immediately. Yield 1.01 g. (74 per cent); the unfractionated reaction product had $E=410$ at 310 mu in chloroform. For the pure compound, M. P. 180–181°; $(a)_D=+90°$ (1 per cent in acetone); $+79°$ (1 per cent in chloroform).

*Preparation of 3(a)-acetoxy-21-methoxy-11-keto - 12- bromo-24,24-diphenyl-$\Delta^{20:22,23:24}$-choladiene (IV) from the corresponding 21-bromo compound (I)*

When the bromo compound, dissolved in a little chloroform is mixed with methanol, the extinction maximum of the former changes immediately from about 323 mu to 305 mu and the extinction coefficient from $\epsilon=27,000$ ($E=382$) to $\epsilon=11,000$. If, however, some HBr is present, the extinction coefficient will remain about 27,000 (at 305 mu). In either case, all the bromine from position 21 is now present as bromide ion. In the former case a partial allylic shift is assumed to take place. The mixture of the isomeric methoxy compounds has not been separated.

7.08 g. of bromo compound dissolved in 150 ml. chloroform was mixed with 300 ml. N/3 HBr in MeOH and allowed to stand at room temperature overnight. Chloroform was added and the organic phase was washed thoroughly with water. The reaction product separated as a solid from dilute methanol, M. P. 101–105°, but was present as an oil with non-polar solvents. It was re-acetylated in position 3 with acetic anhydride and pyridine which yielded the crystalline 3-acetoxy-21-methoxy derivative in 85 per cent yield, M. P. 179–180° (depression with the diacetate); $(a)_D = +103°$ (1 per cent in acetone), $+92°$ (1 per cent in chloroform).

*Preparation of 21-methoxy-3,11-diketo-12-bromo-24,24-diphenyl-$\Delta^{20:22,23:24}$-choladiene (V)*

1.86 g. 3($a$)-hydroxy-21-methoxy-11-keto-12-bromo-24,24-diphenyl-$\Delta^{20:22,23:24}$-choladiene (III), 5.6 g. t. aluminum butoxide, 68 ml. acetone and 225 ml. dry benzene were refluxed for 15 hours. The benzene solution was washed with a solution of Rochelle salt, sodium carbonate and water. The benzene was removed.

The reaction product crystallized after the addition of methanol. Yield 1.28 g. of short needles, M. P. 167–169°. After six recrystallizations from acetone-methanol M. P. 178–180°, $(a)_D + 78°$ (1 per cent in acetone); $+70°$ (1 per cent in chloroform). $\epsilon = 27,000$ ($E = 439$) at 305 mu. The mother liquor crystallized after steam distillation and had the same extinction coefficient, but the melting point suggested a mixture of 3-keto and 3-hydroxy compound.

*Preparation of the 21-bromo derivative of 3,9-epoxy - 11 - keto - 24,24 - diphenylcholadiene-$\Delta^{20:22,23:24}$*

17.8 gm. of 3,9-epoxy-11-keto-24,24-diphenyl-cholene-$\Delta^{23:24}$ were dissolved in 260 ml. of pure carbon tetrachloride to which were added 6.486 gm. of bromosuccinimide (96 per cent). The carbon tetrachloride was refluxed over a 200-watt light bulb for twenty minutes and was heated on a steam bath for six hours to eliminate hydrogen bromide. Another portion of bromosuccinimide, 6.486 gm., was added and the solution was again refluxed for fifteen minutes under the same conditions. The solution was filtered. The filtrate was concentrated practically to dryness and petroleum ether was added. After several hours in the cold room crystals separated and were filtered. Further crops were obtained by concentration to dryness, dissolving the residue in a small amount of chloroform and adding ligroin. 8.76 gm. of crystals were secured. The melting point depended upon the rate of heating. When placed on the melting point apparatus at 234° the melting point was 236–240°. When the stage was heated to 240° the melting point after one minute was 241–243°. When added at 245° the melting point was 246°. $\epsilon = 28,500$ at mu 324.

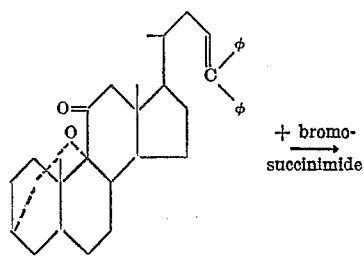

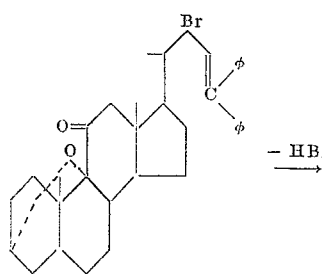

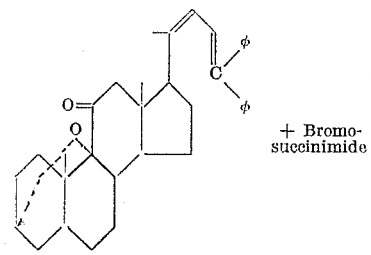

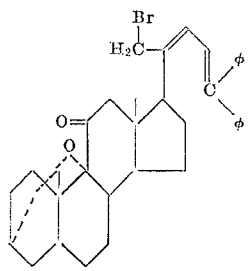

This application is a continuation-in-part of my application Serial No. 734,867, filed March 14, 1947, now abandoned.

I claim:

1. A 3($a$) - acyloxy-11-keto - 12,21 - dibromo-24,24-diphenyl-$\Delta^{20:22,23:24}$-choladiene wherein the acyl group is selected from lower fatty acids and monocyclic aryl monocarboxylic acids.

2. 3($a$) - acetoxy - 11 - keto - 12,21 - dibromo - 24,24-diphenyl-$\Delta^{20:22,23:24}$-choladiene.

3. Process which comprises mixing a 3($a$)-acyloxy - 11 - keto - 12 - bromo - 24,24-diphenyl - $\Delta^{20:22,23:24}$-choladiene with bromosuccinimide in an inert anhydrous organic solvent for the reactants and heating the mixture while subjecting it to illumination to produce the corresponding 21-bromo compound.

4. Process which comprises mixing a 3($a$) - acetoxy - 11 - keto - 12 - bromo - 24,24-diphenyl-$\Delta^{20:22,23:24}$-choladiene with bromosuccinimide in an inert anhydrous organic solvent for the reactants and heating the mixture while subjecting it to illumination to produce the corresponding 21-bromo compound.

EDWARD C. KENDALL.

REFERENCES CITED

The following references are of record in the file of this patent:

Wettstein, Helv. Chim. Acta 30, 1262–1269 (1947).